3,166,482
PROCESS FOR THE MANUFACTURE OF
16β-METHYLPREDNISONE
Dieter Kluepfel and Carolina Coronelli, Milan, Italy, assignors to Lepetit S.p.A., Milan, Italy
No Drawing. Filed Apr. 16, 1963, Ser. No. 273,293
Claims priority, application Great Britain, May 9, 1962, 17,842/62
3 Claims. (Cl. 195—51)

This invention relates to the preparation of 16β-methylprednisone and its 21-acetate.

16β-methylprednisone is a known steroid, the pharmacological activity of which is described in Annals of New York Academy of Sciences 82, 829 (1959). The first preparation processes for 16β-methylprednisone were described in Journal American Chemical Society 80, 4428 and 4435 (1958) and 82, 4012 (1960). Other synthetic processes have since then been described.

This invention consists in a process for producing 16β-methylprednisone or its 21-acetate, in which 16β-methyl-5α-pregnane-17α,21-diol-3,11,20-trione-21-acetate is contacted with the oxidizing activity produced by microorganism of the species *Arthrobacter simplex* (*Corynebacterium simplex*) ATCC 6946.

The process of the invention may be carried out by the following procedure in which 16β-methyl-5α-pregnane-17α,21-diol-3,11,20-trione-21-acetate is brought into contact with an actively growing culture of the organism.

To this purpose the strain used was kept in its lyophilized form. The seeded medium was incubated for 24–48 hours at 28° C. on a rotative shaker at 200 r.p.m. From these cultures, slants were prepared using CB agar, and then incubated at 28° C. A good growth was obtained after 24 hours. Fermentations in glass jars were carried out in quantities of 4 and 10 litres; the quantity of inoculum was in both cases 2.5% and derived for the 4 litre glass jars from Erlenmeyer flasks and for the 10 litre glass jars from prefermenters of 4 litres under standard conditions. The condition for both types of jars were the same: air 1 litre per litre of medium, 28° C. and agitation of 500 r.p.m.

The growth of the bacterium culture was measured by the light extinction at 540 mμ with a Klett colorimeter. 16β-methyl-5α-pregnane-17α,21-diol-3,11,20-trione-21-acetate was dissolved in methanol and added to the fermentation broth. The quantity of methanol added was never higher than 1%.

The steroid transformation was followed chromatographically. For each experiment in shaker flasks a series of Erlenmeyers were run under identical conditions. Every two hours one of these flasks were extracted with chloroform and the concentrated extract chromatographed as described below.

In the case of the glass jar fermentations 50 ml. samples were removed every two hours and extracted in the same manner. The method of extraction of the transformation products was established as follows:

The fermentation broth was agitated twice with the same quantity of chloroform in a separating funnel, separated, and the organic solvent phase dried with a minimum quantity of $Na_2SO_4$. After having been evaporated under reduced pressure to complete dryness the extract was redissolved in methanol to make a final solution of 3000 γ/ml. This solution was analyzed with the aid of thin layer chromatography as follows:

On a glass plate covered with a thin homogeneous layer of Silicagel G the solution was spotted on the starting line. The quantity was calculated to be approximately 30γ. The development was carried out ascendingly, in ethyl acetate for about 20 minutes which correspond to about 10–12 cm. in length. After a period of 10 minutes of drying at room temperature the plate was sprayed evenly with concentrated sulphuric acid and heated for another 20 minutes to 100° C. At this point the steroidal compounds gave brown spots which were even better distinguished under fluorescent light (Wood) since the different steroids gave different colored fluorescence. The sensitivity of this method was extremely high being in the order of 1γ.

The following were the $R_F$-values of the compounds which were of interest:

| | $R_F$ |
|---|---|
| (1) 16β - methyl-5α-pregnane-17α,21-diol-3,11,20-trione-21-acetate | 0.65 |
| (2) 16β-methyl - 5α - pregnane-17α,21-diol-3,11,20-trione | 0.3 |
| (3) 16β - methyl - 5α - pregn - 1 - ene-17α,21-diol-3,11,20-trione-21-acetate | 0.6 |
| (4) 16β - methyl - 5α - pregn-1-ene-17α,21-diol-3,11,20-trione | 0.4 |
| (5) 16β-methylprednisone-21-acetate | 0.5 |

In addition to this qualitative method in some cases quantitative chromatography was applied, using Whatman 1 paper strips (washed in acetone-water, 7:3) in a solvent system of: toluene 9 parts, methanol 5 parts, ethyl acetate 1 part, water 5 parts.

The bands of 16β-methylprednisone were found by UV absorption and eluted with methanol. The determination of maximum extinction was carried out on this extract with a Beckman spectrophotometer ($E_{max}$238 mμ).

Under the experimental conditions used the side product 16β-methyl-5α-pregn-1-ene-17α,21-diol-3,11,20-trione disappeared, or was reduced to traces which could be neglected.

16β-methylprednisone may be isolated from aqueous solution by extraction with various water-immiscible organic solvents. Lower halogenated hydrocarbons, such as chloroform are particularly useful. After extraction, the solvents may be removed by distillation and the solid product then isolated.

This material may be further purified by recrystallization procedures from organic solvents or by chromatography, for instance on alumina columns or on other suitable solid adsorbent materials.

The following examples illustrate the invention without limiting it.

EXAMPLE 1

*16β-methylprednisone*

A culture of *Corynebacterium simplex* ATCC 6946 grown on solid medium was inoculated into a 500 ml. Erlenmeyer flask (Pyrex) containing 100 ml. of nutrient solution having the following composition:

| | | |
|---|---|---|
| Peptone | grams | 6 |
| Casein | do | 4 |
| Yeast autolysate | do | 3 |
| Meat extract | do | 1.5 |
| Glucose | do | 1 |
| Tap water | millilitres | 1000 |

The medium was sterilized before inoculation. The flask was shaken at about 27° C. for about 18 hours. The contents of one shaken flask were used to inoculate four litres of the same sterilized medium in a 10 litres vessel equipped for conducting submerged fermentations. The seeded medium was stirred and aerated under sterile conditions. The stirrer operated at a speed of 500 r.p.m. and aeration was continued through 16 hours at a rate of one half volume of sterile air per volume of medium per minute. From this culture 300 ml. were removed under sterile conditions and used to inoculate ten litres of a sterilized nutrient solution having the following composition:

| | |
|---|---|
| Basamin Busch | grams__ 20 |
| Potassium dihydrogen phosphate | do____ 4 |
| Disodium hydrogen phosphate 2H$_2$O | do____ 8 |
| Tap water | millilitres__ 1000 |

This medium was contained in a 30 litres glass vessel equipped for conducting submerged fermentations. The seeded medium was stirred and aerated under sterile conditions at 27° C. The stirrer was operated at a speed of 500 r.p.m. and the aeration was continued for 14 hours at a rate of half a volume of sterile air per volume per minute. At this point 3 grams of 16β-methyl-5α-pregnane-17α,21-diol-3,11,20-trione-21-acetate were dissolved in 75 ml. of methanol and added to the 10 litres of bacterial culture and the fermentation was continued in the same 30 litres vessel stirring at a speed of 500 r.p.m. and an aeration at a rate of half a volume per volume of culture per minute. The temperature was kept at 28° C. Samples were removed at intervals and the steroids were extracted into chloroform. After separation of the organic phase, the solvent was removed and the product analyzed by thin layer chromatography (method by Stahl) the compounds being made visible by reaction with concentrated sulphuric acid and illumination with U.V. light (Wood). The reaction proceeded quite rapidly and in 18 to 20 hours the maximum dehydrogenation of the steroid nucleus had taken place.

EXTRACTION

To 10 litres of fermented broth, 5 litres of chloroform were added; the mixture was kept under stirring for 30 minutes and then centrifuged; the broth was separated and again extracted with 5 litres of chloroform.

The combined extracts were collected, filtered on paper to remove the residual water traces and evaporated in vacuo to a final volume of about 100 ml. The solution was treated with a small quantity of animal charcoal, filtered and poured into 600-700 ml. of petroleum ether. The precipitate was collected, washed with petroleum ether and dried in vacuo.

PURIFICATION

Twenty grams of crude product were dissolved by warming in 500 ml. of ethanol. The solution was filtered, treated with a small quantity of charcoal and concentrated to about 300 ml., and diluted with water until crystallization occurred; cooled and again diluted until a further addition of water did not cause any further precipitation. The crystalline product was dissolved with heating in 2 litres of ethyl acetate and the solution was treated with charcoal and concentrated. 16β-methylprednisone was obtained with the following physical characteristics: M.P. 200-205° C. $[\alpha]_D^{20} = +201°$, $$\lambda_{max}\ 238,\ E_{1\ cm.}^{1\%} = 416$$

EXAMPLE 2

*16-β-methylprednisone-21-acetate*

Twenty grams of crude product, obtained as described in Example 1, were dissolved in 90 ml. of pyridine. The solution was filtered and treated with 36 ml. of acetic anhydride. The solution was kept overnight at room temperature, then poured into 400 ml. of water and 100 g. of ice. 10% hydrochloric acid was added under stirring to reach a slightly acidic pH.

The solution was filtered and the precipitate was washed with water containing a small quantity of hydrochloric acid and with distilled water to give 19 g. of crude 16β-methylprednisone-21-acetate. The crude product was dissolved in 1300 ml. of ethyl acetate; the obtained solution was treated with charcoal and concentrated to small volume.

The 16β-methylprednisone-21-acetate obtained had the following physical characteristics: M.P. 230-233° C. $[\alpha]_D^{20} = +216$ (c.1 CHCl$_3$)

$$\lambda_{max}\ 238,\ E_{1\ cm.}^{1\%} = 359$$

We claim:
1. A process for preparing 16β-methylprednisone, which comprises subjecting 16β-methyl-5α-pregnane-17α,21-diol-3,11,20-trione-21-acetate to the oxidizing activity of a microorganism of the class consisting of *Arthrobacter simplex* (*Corynebacterium simplex*) and its mutants and variants.

2. A process for preparing 16β-methylprednisone, which comprises subjecting 16β-methyl-5α-pregnane-17α,21-diol-3,11,20-trione-21-acetate to the oxidizing activity of *Arthrobacter simplex* (*Corynebacterium simplex*) ATCC 6946.

3. A process for preparing 16β-methylprednisone, which comprises growing *Arthrobacter simplex* (*Corynebacterium simplex*) ATCC 6946 in a nutrient medium containing a source of assimilable carbon and a source of assimilable nitrogen under aerobic submerged conditions and adding 16β-methyl-5α-pregnane-17α,21-diol-3,11,20-trione-21-acetate to the culture medium.

References Cited by the Examiner

UNITED STATES PATENTS

| | | | |
|---|---|---|---|
| 2,837,464 | 6/58 | Nobile | 195—51.011 |
| 2,932,639 | 4/60 | Oliveto et al. | 195—51 |
| 2,950,226 | 8/60 | Mannhardt et al. | 195—51 |
| 3,047,569 | 7/62 | Holmlund et al. | 195—51 |
| 3,105,842 | 10/63 | Thoma et al. | 195—51 |

A. LOUIS MONACELL, *Primary Examiner.*